Feb. 16, 1965 W. VOGT ETAL 3,169,911
PROCESS FOR SEPARATING ACRYLIC ACID N-BUTYL ESTER FROM N-BUTANOL
AND ANOTHER IMPURITY BY DISTILLATION WITH ACETOPHENONE
Filed Aug. 30, 1962
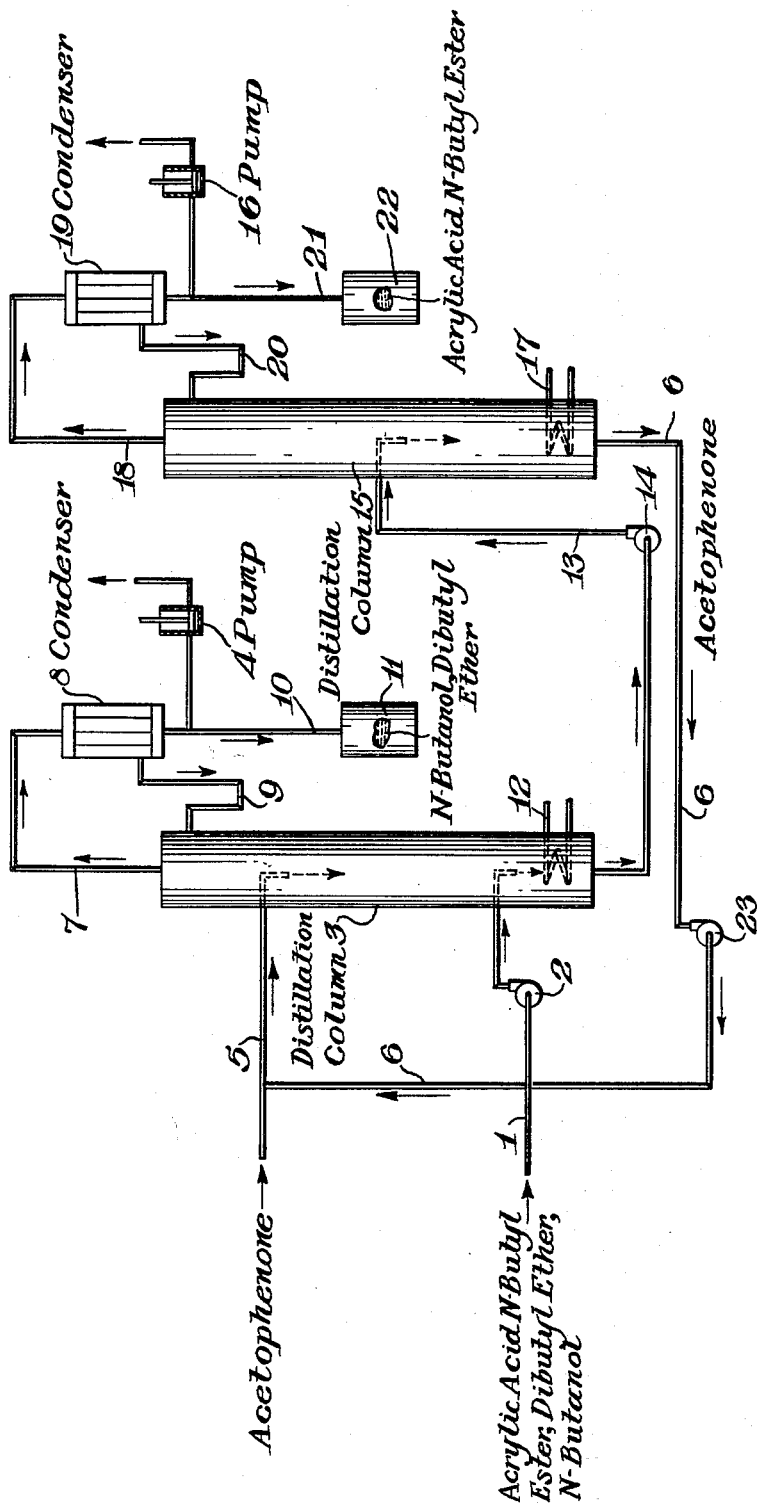

United States Patent Office
3,169,911
Patented Feb. 16, 1965

3,169,911
PROCESS FOR SEPARATING ACRYLIC ACID
n-BUTYL ESTER FROM n-BUTANOL AND
ANOTHER IMPURITY BY DISTILLATION
WITH ACETOPHENONE
Wilhelm Vogt, Knapsack, near Cologne, Klaus Gehrmann, Efferen, near Cologne, Kurt Sennewald, Knapsack, near Cologne, and Hans Cöln, Hurth, near Cologne, Germany, assignors to Knapsack-Griesheim Aktiengesellschaft, Knapsack, near Cologne, Germany, a corporation of Germany
Filed Aug. 30, 1962, Ser. No. 220,569
Claims priority, application Germany, Sept. 21, 1961,
K 44,763
10 Claims. (Cl. 202—39.5)

The present invention relates to process for separating acrylic acid n-butylester from mixtures with n-butanol, dibutylether, and acetic acid n-butylester by extractive distillation with acetophenone.

It is known that acrylic acid n-butylester can be separated from n-butanol by distillation at atmospheric pressure, but this known process involves losses of acrylic acid n-butylester which are due to the polymerization of the ester which appears in concentrated form in the still of the distillation column. The polymerization of the ester is more especially the result of the relatively high distillation temperatures. On the other hand, it is impossible to separate acrylic acid n-butylester from corresponding mixtures by distillation under reduced pressure and at temperatures at which the polymerization of the ester is substantially suppressed, because acrylic acid n-butylester forms an azeotrope with n-butanol at a pressure of less than 300 mm. of mercury.

German Patent 852,851 describes a process for separating azeotropic mixtures of acrylic acid esters with alcohols, wherein the azeotrope is admixed with a distillation auxiliary, for example hexane, which forms with the alcohol a low-boiling binary mixture, and the latter is separated from the ester by distillation. This process offers the disadvantage that uneconomic amounts of distillation auxiliary must be used, and the further disadvantage that the ester must be further distilled to obtain the pure product.

In a further known process, mixtures of acrylic acid esters with alcohols corresponding to the alcoholic component of the ester are separated into their components by extractive distillation with water. This process is advantageously used for separating acrylic acid methylester from methanol, the latter being readily soluble in water. Basically, this process may also be used for separating acrylic acid n-butylester from n-butanol, but the amount of water required for washing out the butanol is so great, due to the limited solubility of butanol in water, that the economy of the process is impaired.

German Patent 1,066,584 describes a process for separating mixtures having constant boiling points, for example of acrylic acid methylester with methanol or corresponding ethanol mixtures, by extractive distillation with organic solvents, wherein the ester-alcohol-mixture is admixed with a dicarboxylic acid ester, a hydrocarbon, a ketone or a ketoester, the alcohol is distilled off, and the ester is separated by distillation from the distillation auxiliary added. The boiling points of the distillation auxiliaries added in this process should be advantageously about 70 to 100° C. higher than the boiling point of the ester to be separated; moreover, the auxiliaries should not form azeotropic mixtures with the ester and the alcohol.

The distillation auxiliaries used include oxalic acid diethylester, tetrahydronaphthalene, decahydronaphthalene, octane, nonane, decane, anisol, aceto-acetic acid ester, and acetophenone. The starting mixture is first separated in the above process into a mixture consisting of (a) ester and distillation auxiliary and (b) alcohols, and the ester and distillation auxiliary are then separated from one another by normal distillation.

All the above known processes are inappropriate for separating acrylic acid n-butylester from mixtures with n-butanol, dibutylether, and acetic acid n-butylester since these known processes are uneconomical and only disclose steps for the separation of binary ester-alcohol mixtures, which are unsuitable for separating dibutylether and acetic acid n-butylester likewise present in the starting mixture used in this invention.

The present invention unexpectedly provides a process for separating into their components mixtures of acrylic acid n-butylester with n-butanol, which may also contain as additional components various amounts of dibutylether and/or acetic acid n-butylester and other contaminations by simple extractive distillation, wherein acetophenone is added to the mixture to be extracted, n-butanol, dibutylether and/or acetic acid n-butylester are distilled off, and the resulting residue consisting of acrylic acid n-butylester and acetophenone is separated into its components by fractional distillation.

This is an unexpected result since in view of the art as disclosed in German Patent 1,066,584 the starting mixture used in the process of this invention would have been expected to be separated into (a) a mixture consisting of acrylic acid n-butylester, acetic acid n-butylester, and acetophenone and (b) a mixture consisting of n-butanol and dibutylether.

Contrary to such expectation, due to the extractive distillation with acetophenone, the starting mixture to be extracted is separated into (a) acrylic acid n-butylester and (b) its other components. In other words, the present process enables acrylic acid n-butylester to be separated without difficulty from a multiple substance mixture having the above composition. The effect produced by the process of this invention is particularly noteworthy in permitting acrylic acid n-butylester to be separated besides from n-butanol from a further ester and an ether having approximately the same boiling point as the acrylic acid n-butylester.

In one mode of executing the present process, the mixture to be extracted is introduced into the lower part of a distilling column, heated to boiling in vacuo under a pressure of between about 50 and 300 mm. mecrucy, preferably 140 mm. mercury, and the vapor ascending in the column is extracted with liquid pre-heated acetophenone flowing countercurrently to that ascending vapor. The use of apropriate temperatures in the extracting column and the use of about 5 to 10, preferably 6 to 7, times the amount by weight of extracting agent, calculated on the amount of starting mixture used, enable the acetic acid n-butylester, dibutylether and n-butanol to be withdrawn quantitatively from the extracting column as the head product, whereas the acrylic acid n-butylester together with the acetophenone remains in the sump of the column. In a second distilling column, the acrylic acid n-butylester is separated from the acetophenone in known manner and obtained in 100% purity. Although the acrylic acid n-butylester appears in the extracting column in relatively strong dilution and is exposed therein to the action of relatively low temperatures, so that a polymerization of the ester is substantially excluded, it is advantageous to stabilize the starting mixture to be extracted with a customary polymerization inhibitor, for example hydroquinone, pyrogallol, and phenothiazine. It is also advantageous to stabilize the ester in the same manner during the distillative separation from acetophenone.

The advantages offered by the process of this invention become especially distinct in the simultaneous separation of n-butanol, dibutylether, and acetic acid n-butylester from a mixture with acrylic acid n-butylester, the isolation of the dibutylether from the acrylic acid n-butylester being particularly interesting for the reasons stated above.

The starting mixture used in the process of this invention being a process product obtained during the manufacture of acrylic acid n-butylester from acrylic acid contaminated with acetic acid, and n-butanol, the proposed process for purifying crude acrylic acid n-butylester contributes decisively to the manufacture of pure acrylic acid n-butylester in economic manner.

The invention is illustrated by the following examples with reference to the accompanying drawing forming a part of this specification, the single figure of which is a schematic flow diagram of the apparatus and steps used. The invention is not limited to the specific embodiment shown in the drawing and described below.

*Example 1*

150 parts by weight of a mixture consisting of 25% by weight acrylic acid n-butyl ester, 25% by weight dibutyl ether and 50% by weight n-butanol were introduced per hour through line 1 and with the help of pump 2 into the lower quarter of a distilling column 3 comprising 40 bubble trays. By means of heater 12 the whole was heated at a temperature of about 145° C. under a pressure of 140 mm. mercury adjusted by means of vacuum pump 4. The vapor ascending in column 3 was washed in countercurrent manner with liquid acetophenone preheated at 85° C., the acetophenone being introduced into the upper quarter of distillation column 3 through lines 5 and 6 in a proportion of 1000 parts by weight per hour. During the distillation, column 3 was maintained at a reflux ratio of about 2:1. The vapor mixture consisting of n-butanol and dibutyl ether leaving column 3 through line 7 at a temperature of 76° C. was condensed in condenser 8, a portion of the resulting condensed matter being refluxed through line 9 into column 3, while the bulk of the condensed matter was conveyed through line 10 to container 11. A mixture of 1000 parts by weight acetophenone and 37.5 parts by weight acrylic acid n-butyl ester was removed from the still portion in distillation column 3 through line 13 with the help of pump 14, introduced into the middle portion of a second distilling column 15, in which a pressure of 70 mm. mercury was maintained with the aid of pump 16, and separated therein by distillation. Column 15 was provided with heater 17 to heat the mixture. The vapors of pure acrylic acid n-butyl ester escaping through line 18 were liquefied in condenser 19, a portion of the resulting condensate being refluxed through line 20 into the upper portion of column 15. The bulk of the ester was removed through line 21 and collected in container 22. The acetophenone obtained as the distillation residue in the sump portion of column 15 was withdrawn through line 6 and returned by pump 23 through line 5 into column 3. The yield of recovered acrylic acid n-butyl ester having a purity of 99.8%, was 37.3 to 37.5 parts by weight or 99.3 to 99.8%, calculated on the amount of acrylic acid n-butyl ester initially present in the feed.

*Example 2*

150 parts by weight of a mixture consisting of 25% by weight acrylic acid n-butylester, 5% by weight acetic acid n-butylester, and 70% by weight n-butanol and 1500 parts by weight acetophenone were introduced in a manner analogous to that described in Example 1 into the extracting column, and separated by distillation.

A mixture free from acrylic acid n-butylester and consisting of 105 parts by weight n-butanol and 7.5 parts by weight acetic acid n-butylester was removed per hour at the head of the extracting column. The sump product was distilled and 37.3 to 37.5 parts by weight of 99.8% acrylic acid n-butylester were recovered, corresponding to a yield of 99.3 to 99.8% calculated on the amount of acrylic acid n-butylester initially present in the mixture.

*Example 3*

150 parts by weight of a mixture consisting of 25% by weight acrylic acid n-butylester, 5% by weight dibutylether, 5% by weight acetic acid n-butylester, and 65% by weight n-butanol and 1500 parts by weight acetophenone were introduced in a manner analogous to that described in Example 1 into the extracting column, and separated by distillation.

A mixture consisting of 97.5 parts by weight n-butanol, 7.5 parts by weight dibutylether and 7.5 parts by weight acetic acid n-butylester was removed per hour at the head of the extracting column. The sump product was distilled and 37.3 to 37.6 parts by weight of 99.7% acrylic acid n-butylester were recovered, corresponding to a yield of 99.1 to 100%, calculated on the amount of acrylic acid n-butylester initially present in the mixture.

We claim:

1. A process for separating into its components a mixture of acrylic acid n-butylester and n-butanol which mixture also contains as an additional component at least one substance selected from the group consisting of di-n-butylether and acetic acid n-butylester which comprises adding acetophenone to the mixture, distilling off n-butanol and the additional component as head product from the resulting acetophenone-containing mixture, and separating by fractional distillation the residue obtained which consists of acrylic acid n-butylester and acetophenone.

2. The process as claimed in claim 1, wherein the mixture to be extracted is treated with acetophenone in an amount of about 5 to 10 times the weight of the mixture to be extracted, the acetophenone being caused to flow countercurrently to that mixture.

3. The process as claimed in claim 2 wherein the acetophenone is in an amount of about 6 to 7 times the weight of the mixture to be extracted.

4. The process as claimed in claim 1, wherein the mixture to be extracted is stabilized before the distillation with at least one substance selected from the group consisting of hydroquinone, pyrogallol and phenothiazine.

5. A process according to claim 1 wherein the mixture of acrylic acid n-butyl ester, n-butanol and additional component is introduced into the lower part of a first distilling column, the mixture is heated to boiling under a pressure of between about 50 and 300 mm. mercury, the vapor ascending in the first column is extracted with liquid acetophenone flowing countercurrently to that ascending vapor in an amount of about 5 to 10 times as high as the weight of the mixture to be extracted, n-butanol and the additional component are drawn off a head product, acetophenone and acrylic acid-n-butylester are collected in the sump and acrylic acid-n-butylester is separated from the acetophenone by fractional distillation in a second distilling column.

6. The process as claimed in claim 1, wherein the distillation is carried out under reduced pressure.

7. The process as claimed in claim 1, wherein the distillation is carried out under a pressure within the range of about 50 to 300 mm. mercury.

8. The process as claimed in claim 1, wherein the distillation is carried out under a pressure of about 140 mm. mercury.

9. The process as claimed in claim 1, wherein the liquid acetophenone is pre-heated to about 85° C.

10. The process as claimed in claim 1, wherein a reflux ratio of about 2:1 is maintained during the distillation.

References Cited in the file of this patent

UNITED STATES PATENTS

| | | |
|---|---|---|
| 2,406,561 | Rehberg | Aug. 27, 1946 |
| 2,741,583 | Vaugham et al. | Apr. 10, 1956 |
| 3,022,338 | Enk et al. | Feb. 20, 1962 |
| 3,067,241 | Vogt et al. | Dec. 4, 1962 |

FOREIGN PATENTS

| | | |
|---|---|---|
| 1,066,584 | Germany | Oct. 8, 1959 |
| 1,088,040 | Germany | Sept. 1, 1960 |